(12) United States Patent
Kusunose

(10) Patent No.: US 9,509,149 B2
(45) Date of Patent: Nov. 29, 2016

(54) POWER MANAGEMENT SYSTEM AND MANAGEMENT METHOD

(75) Inventor: Tomonari Kusunose, Higashiomi (JP)

(73) Assignee: KYOCERA CORPORATION, Kyoto (JP)

( * ) Notice: Subject to any disclaimer, the term of this patent is extended or adjusted under 35 U.S.C. 154(b) by 377 days.

(21) Appl. No.: 14/235,213

(22) PCT Filed: Jul. 23, 2012

(86) PCT No.: PCT/JP2012/068621
§ 371 (c)(1),
(2), (4) Date: Jan. 27, 2014

(87) PCT Pub. No.: WO2013/015256
PCT Pub. Date: Jan. 31, 2013

(65) Prior Publication Data
US 2014/0183945 A1    Jul. 3, 2014

(30) Foreign Application Priority Data

Jul. 27, 2011 (JP) ................................. 2011-164488

(51) Int. Cl.
| H02J 7/00 | (2006.01) |
| H02J 3/32 | (2006.01) |
| H02J 3/38 | (2006.01) |
| H02J 3/00 | (2006.01) |
| H02J 1/14 | (2006.01) |

(52) U.S. Cl.
CPC .. *H02J 7/00* (2013.01); *H02J 3/00* (2013.01); *H02J 3/32* (2013.01); *H02J 3/383* (2013.01); *Y02E 10/563* (2013.01); *Y02E 10/566* (2013.01); *Y02E 70/30* (2013.01); *Y10T 307/305* (2015.04)

(58) Field of Classification Search
CPC ........................................................ H02J 1/14
USPC ............................................................ 307/66
See application file for complete search history.

(56) References Cited

U.S. PATENT DOCUMENTS

| 8,922,056 B2* | 12/2014 | Thisted ..................... H02J 7/34 307/18 |
| 8,941,263 B2* | 1/2015 | Lee ........................... H02J 3/32 307/140 |
| 2004/0070280 A1 | 4/2004 | Nakata et al. |

(Continued)

FOREIGN PATENT DOCUMENTS

| JP | 06-133472 A | 5/1994 |
| JP | 2004-180467 A | 6/2004 |

(Continued)

OTHER PUBLICATIONS

Extended European Search Report dated Oct. 15, 2015, issued in counterpart Korean/Japanese application No. PCT/JP2012/068621.

(Continued)

*Primary Examiner* — Robert Deberadinis
(74) *Attorney, Agent, or Firm* — Procopio Cory Hargreaves and Savitch LLP

(57) ABSTRACT

A power management system comprises a power generation equipment that generates power and a storage battery that stores power, and is connected to a power grid. The power management system comprises: a control unit that controls an operation mode of the storage battery so as to start charging the storage battery when a voltage value of the power grid exceeds a predetermined system voltage threshold value.

7 Claims, 8 Drawing Sheets

(56) References Cited

U.S. PATENT DOCUMENTS

2011/0006905 A1 1/2011 Masuda
2011/0144822 A1 6/2011 Choi

FOREIGN PATENT DOCUMENTS

| JP | 2010-130836 A | 6/2010 |
| JP | 2011-019315 A | 1/2011 |
| JP | 2011-114930 A | 6/2011 |
| JP | 2012-139019 A | 7/2012 |

OTHER PUBLICATIONS

International Search Report; PCT/JP2012/068621; Oct. 16, 2012.

* cited by examiner

POWER MANAGEMENT SYSTEM AND MANAGEMENT METHOD

TECHNICAL FIELD

The present invention relates to a power management system including a power generation equipment and a storage battery, and a management method therefor.

BACKGROUND ART

Conventionally, there has been known a power generation equipment such as a photovoltaic cell (PV) or a solid oxide fuel cell (SOFC). Also known is a system of controlling an interconnection between a power generation equipment and a power grid (hereinafter, Energy Management System (EMS)). The EMS controls such that power supplied by the power generation equipment is output to a power grid (reverse power flow control), and so forth (for example, Patent Literature 1).

However, for example, in a case in which a large number of power generation equipment are connected to a power grid, when power is output to the power grid from the large number of power generation equipment, the voltage value of the power grid is increased. When the voltage value of the power grid reaches an allowable voltage value, the power output from the power generation equipment to the power grid (reverse flow power) is suppressed so that power is not output to the power grid in a state in which a voltage value of the power grid exceeds an allowable voltage value that is allowable in the power grid.

As described above, when the voltage value of the power grid reaches the allowable voltage value, the power output from the power generation equipment to the power grid (reverse flow power) is suppressed.

In such a case, it is necessary to reduce the power generated by the power generation equipment. However, it is assumed that there is a case in which the power generation capability of the power generation equipment is not sufficiently utilized. For example, in a case in which the power generation equipment is equipment that generates power by using natural energy, the use efficiency of the natural energy declines. Further, in a case in which a following capability of the amount of generated power is not excellent, the power generated by the power generation equipment is wasted.

CITATION LIST

Patent Literature

Patent Literature 1: Japanese Patent Publication No. 2011-114930

SUMMARY OF THE INVENTION

A power management system according to the first feature comprises a power generation equipment that generates power and a storage battery that stores power, and is connected to a power grid. The power management system comprises: a control unit that controls an operation mode of the storage battery so as to start charging the storage battery when a voltage value of the power grid exceeds a predetermined system voltage threshold value.

When the voltage value of the power grid exceeds the predetermined system voltage threshold value, the control unit controls a connection between the power generation equipment and the storage battery so that the power supplied from the power generation equipment is directly supplied to the storage battery without passing through the power grid.

In the first feature, the power management system comprises a first control unit that controls the storage battery. The first control unit detects whether or not the voltage value of the power grid exceeds the predetermined system voltage threshold value and configures the control unit.

In the first feature, the power management system comprises a second control unit that controls the power generation equipment. The second control unit detects whether or not the voltage value of the power grid exceeds the predetermined system voltage threshold value and configures the control unit.

In the first feature, when the voltage value of the power grid falls below the predetermined system voltage threshold value, the control unit controls the operation mode of the storage battery so as to stop charging the storage battery.

In the first feature, when the amount of power stored in the storage battery exceeds a predetermined amount of power stored, the control unit controls the operation mode of the storage battery so as to stop charging the storage battery.

In the first feature, when the amount of power generated by the power generation equipment falls below a predetermined amount of power generated, the control unit controls the operation mode of the storage battery so as to stop charging the storage battery.

A power management method according to the second feature is a method used in a power management system comprising a power generation equipment that generates power and a storage battery that stores power, and being connected to a power grid. The power management method comprises: a step of controlling an operation mode of the storage battery so as to start charging the storage battery when a voltage value of the power grid exceeds a predetermined system voltage threshold value.

DESCRIPTION OF THE EMBODIMENT

Figure 1:
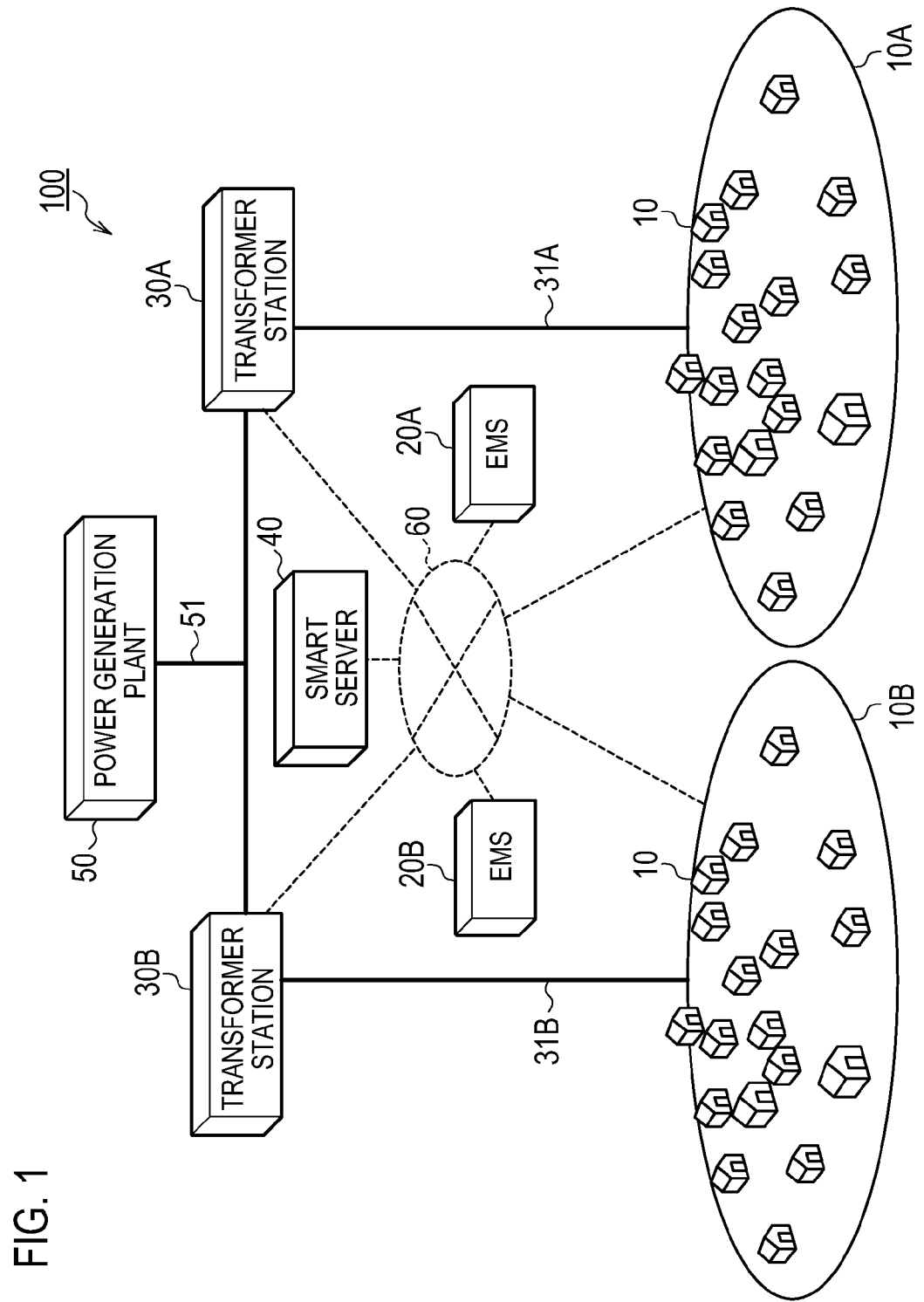
FIG. 1 is a schematic view of a power management system according to the first embodiment.

With reference to the drawings, an embodiment of the present invention will be described. In the drawings of the following embodiment, the same or similar reference signs are applied to the same or similar portions.

Note that that the drawings are schematic, and the ratio of each dimension and the like are different from real ones. Accordingly, specific dimensions and the like should be decided with reference to the following description. Furthermore, it must be understood that, among the drawings, the relationship or ratio of dimensions may differ from each other.

SUMMARY OF THE EMBODIMENT

The power management system according to the embodiment comprises a power generation equipment that generates power and a storage battery that stores power, and is connected to a power grid. The power management system comprises: a control unit that controls an operation mode of the storage battery so as to start charging the storage battery when a voltage value of the power grid exceeds a predetermined system voltage threshold value.

It is noted that the predetermined system voltage threshold value is determined according to an allowable voltage value (for example, 101 V+6 V=107 V) that is allowable in a power grid. For example, the predetermined system voltage threshold value may be the allowable voltage value or a value obtained by subtracting a predetermined margin from the allowable voltage value.

In the embodiments, the control unit controls the operation mode of the storage battery so as to start charging the storage battery, when a voltage value of the power grid exceeds the predetermined system voltage threshold value. Accordingly, in a case in which the power generated by the power generation equipment is supplied to the storage battery via the power grid, a load connected to the power grid is increased and an increase in voltage value of the power grid is suppressed. In a case in which the power generated by the power generation equipment is supplied to the storage battery without passing through the power grid, the power generated by the power generation equipment is used without affecting the voltage value of the power grid. Thus, the power generation capability of the power generation equipment can be utilized.

It is noted that the power generation equipment is one that utilizes natural energy, such as a photovoltaic cell, a wind power generation equipment, or a water power generation equipment. Alternatively, the power generation equipment is a fuel cell that utilizes fuel such as gas. The storage battery may be a battery provided in an EV (Electric Vehicle).

First Embodiment

Overview of Power Management System

Hereinafter, an overview of a power management system according to a first embodiment will be described. FIG. 1 is a schematic view of a power management system 100 according to the first embodiment.

As shown in FIG. 1, the power management system 100 includes a consumer 10, an EMS 20, a transformer station 30, a smart server 40, and an power generation plant 50. It is noted that the consumer 10, the EMS 20, the transformer station 30, and the smart server 40 are connected by a network 60.

The consumer 10 has a distributed power supply such as a photovoltaic cell. The consumer 10 may also have another power supplying means, such as a storage battery, as a distributed power supply. It is noted that the consumer 10 may be a detached house, a housing complex such as an apartment house, a business facility such as an office building, or a factory.

In the first embodiment, a consumer group 10A and a consumer group 10B are configured by a plurality of the consumers 10. The consumer group 10A and consumer group 10B are classified by geographical region, for example.

The EMS 20 controls an interconnection between the plurality of consumers 10 and the power grid. It is noted that the EMS 20 is also called a CEMS (Cluster Energy Management System), since the EMS 20 manages the plurality of consumers 10. Specifically, the EMS 20 performs off-line of the plurality of consumers 10 from the power grid at a power failure or the like. On the other hand, the EMS 20 interconnects the plurality of consumers 10 to the power grid, for example, at power recovery.

In the first embodiment, an EMS 20A and an EMS 20B are provided. The EMS 20A controls an interconnection between the consumers 10 included in the consumer group 10A and the power grid, for example. The EMS 20B controls an interconnection between the consumers 10 included in the consumer group 10B and the power grid, for example.

The transformer station 30 supplies power to the plurality of consumers 10 through a distribution line 31. Specifically, the transformer station 30 lowers the voltage supplied from the power generation plant 50.

In the first embodiment, a transformer station 30A and a transformer station 30B are provided. The transformer station 30A supplies power to the consumers 10 included in the consumer group 10A through a distribution line 31A, for example. The transformer station 30B supplies power to the consumers 10 included in the consumer group 10B through a distribution line 31B, for example.

The smart server 40 manages a plurality of the EMSs 20 (here, the EMS 20A and EMS 20B). Further, the smart server 40 manages a plurality of the transformer stations 30 (here, the transformer station 30A and the transformer station 30B). In other words, the smart server 40 integrally manages the consumers 10 included in the consumer groups 10B and 10A. For example, the smart server 40 has a function of balancing the power to be supplied to the consumer group 10A and the power to be supplied to the consumer group 10B.

The power generation plant 50 generates power by thermal power, wind power, water power, atomic power or the like. The power generation plant 50 supplies power to the plurality of the transformer stations 30 (here, the transformer station 30A and the transformer station 30B) through an electric feeder line 51.

(Details of Power Management System)

Figure 2:
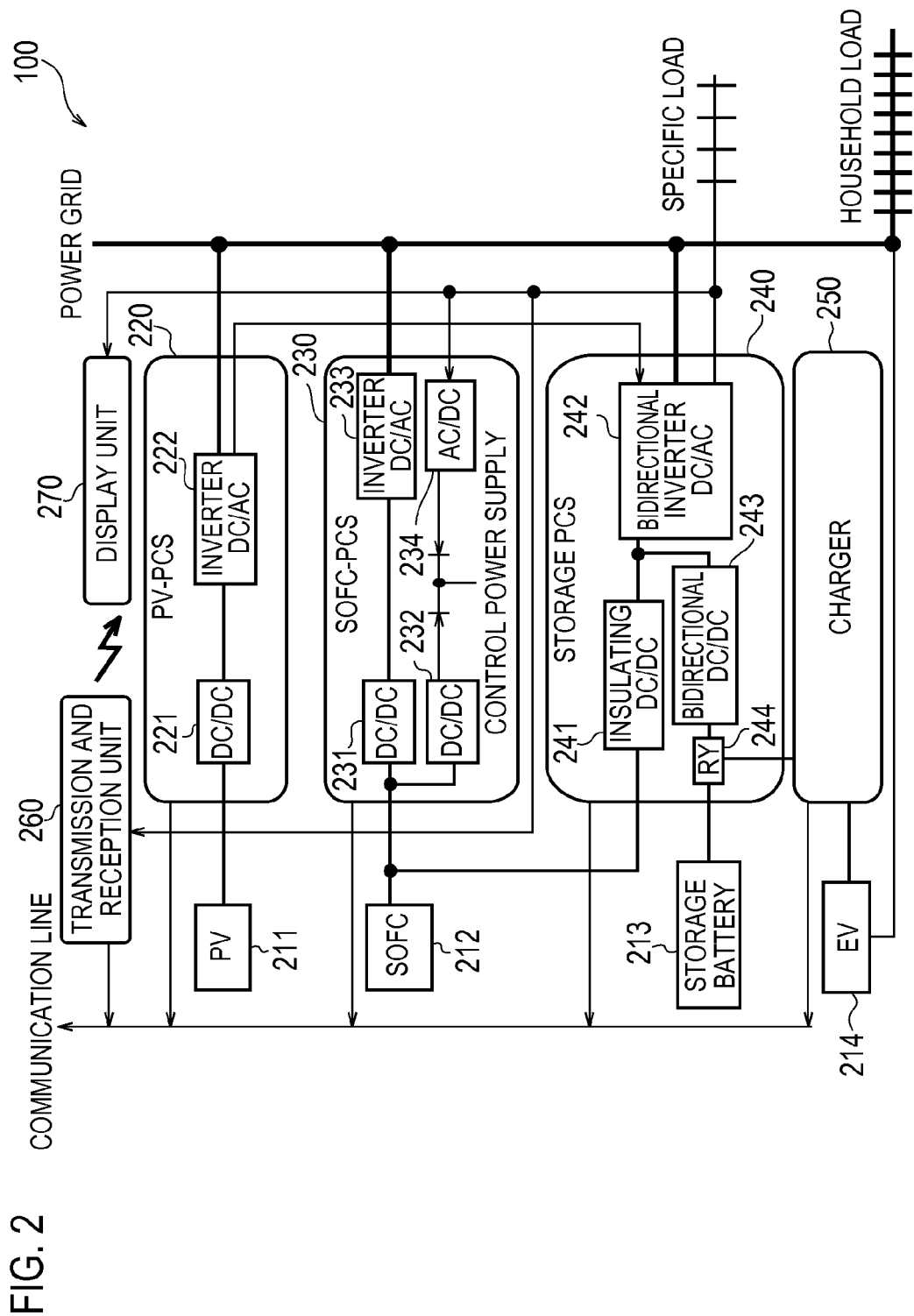
FIG. 2 is a detailed view of the power management system according to the first embodiment.

Hereinafter, details of the power management system according to the first embodiment will be described. FIG. 2 shows the details of the power management system 100 according to the first embodiment. Here, the above-described consumer 10 will be described as an example.

As shown in FIG. 2, the power management system 100 includes a photovoltaic cell 211 (hereinafter, PV 211), a fuel cell 212 (hereinafter, SOFC 212), a storage battery 213, an electric vehicle 214 (hereinafter, EV 214), a PV-PCS 220, an SOFC-PCS 230, an storage PCS 240, a charger 250, a transmission and reception unit 260, and a display unit 270.

The PV 211 is an example of the power generation equipment generating power. In particular, the PV 211 generates power by using natural energy (sunlight).

The SOFC 212 is an example of the power generation equipment generating power. In particular, the SOFC 212 generates power by using fuel such as hydrogen or natural gas. A certain period of time after change of the amount of power generated by the SOFC 212 is instructed until the amount of power generated by the SOFC 212 is actually changed is required. In other words, the followability of the amount of power generated by the SOFC 212 is not excellent.

The storage battery 213 is equipment that stores power. In addition, the EV 214 includes a battery storing power. That is, the storage battery 213 and EV 214 are examples of the storage batteries storing power.

The PV-PCS 220 (Power Conditioning System) is equipment that controls the PV 211. The PV-PCS 220 includes a DC/DC 221 and an inverter DC/AC 222.

The DC/DC 221 is connected to the PV 211 and inverter DC/AC 222. The DC/DC 221 raises a voltage of the power output from the PV 211.

The inverter DC/AC 222 is connected to the DC/DC 221. Through a switch (not illustrated), the inverter DC/AC 222 is connected to the power grid (distribution line 31) or the storage PCS 240. The inverter DC/AC 222 converts DC power supplied from the DC/DC 221 into AC power.

For example, the inverter DC/AC 222 is connected to the power grid in a state in which the PV 211 is interconnected to the power grid. On the other hand, the inverter DC/AC 222 is connected to the storage PCS 240 in a state in which the PV 211 is off-lined from the power grid.

The SOFC-PCS 230 is equipment (Power Conditioning System) that controls the SOFC 212. The SOFC-PCS 230 includes a DC/DC 231, a DC/DC 232, an inverter DC/AC 233, and an AC/DC 234.

The DC/DC 231 is connected to the SOFC 212 and the inverter DC/AC 233. The DC/DC 231 raises a voltage of the power output from the SOFC 212.

The DC/DC 232 is connected to the SOFC 212, and lowers the voltage of the power generated in the SOFC 212 to supply the power to a control power supply. The AC/DC 234 is connected to the DC/DC 232 and storage PCS 240, and converts AC power supplied from the storage PCS 240 into DC power to supply the DC power to the control power supply. The power generated by the DC/DC 232 is used as start-up power of the SOFC 212.

The inverter DC/AC 233 is connected to the DC/DC 231 and the power grid (distribution line 31). The inverter DC/AC 233 converts DC power supplied from the DC/DC 231 into AC power.

The storage PCS 240 is equipment (Power Conditioning System) that controls the storage battery 213. The storage PCS 240 includes an insulating DC/DC 241, a bidirectional inverter 242, a bidirectional DC/DC 243, and a relay 244 (hereinafter, RY 244).

The insulating DC/DC 241 is connected to the SOFC 212 and the bidirectional DC/DC 243. The insulating DC/DC 241 raises a voltage of the power supplied from the SOFC 212.

The bidirectional inverter 242 is connected to the insulating DC/DC 241, the PV-PCS 220, the power grid (distribution line 31), and a specific load. The bidirectional inverter 242 converts DC power supplied from the insulating DC/DC 241 into AC power. On the other hand, the bidirectional inverter 242 converts AC power supplied from the PV-PCS 220 or power grid into DC power.

It is noted that the specific load is connected to the power grid through an internal relay at a normal time, and the specific load operates by the AC power supplied by the bidirectional inverter 242 at a power failure.

The bidirectional DC/DC 243 is connected to the insulating DC/DC 241 and the bidirectional inverter 242. The bidirectional DC/DC 243 is connected to the storage battery 213 through the RY 244. The bidirectional DC/DC 243 lowers the voltage of the power supplied from the insulating DC/DC 241 or the bidirectional inverter 242. On the other hand, the bidirectional DC/DC 243 raises a voltage of power supplied from the storage battery 213.

The RY 244 is connected to the storage battery 213. The RY 244 is connected to the EV 214 through the charger 250. The RY 244 switches between supplying the power supplied from the bidirectional DC/DC 243 to the storage battery 213 and supplying, through the charger 250, the power supplied from the bidirectional DC/DC 243 to the EV 214.

The charger 250 controls charging a battery provided in the EV 214. The charger 250 includes a connector, and the like that connects the charger 250 to the EV 214.

The transmission and reception unit 260 is connected to the storage PCS 240 and is operated by the power accumulated in the storage battery 213 (or the EV 214). Further, the transmission and reception unit 260 is connected to a communication line and receives information from the PV-PCS 220, the SOFC-PCS 230, the storage PCS 240, and the charger 250. Similarly, the transmission and reception unit 260 is connected to a communication line and transmits information to the PV-PCS 220, the SOFC-PCS 230, the storage PCS 240, and the charger 250. It is noted that the transmission and reception unit 260 is connected to the display unit 270, for example, wirelessly, and transmits information to the display unit 270.

The display unit 270 is connected to the storage PCS 240 and is operated by the power accumulated in the storage battery 213 (or the EV 214). The display unit 270 displays the information and the like that are received from the transmission and reception unit 260.

In the first embodiment, the PV-PCS 220 or the storage PCS 240 configures the control unit that controls the operation mode of the storage battery 213 (or the EV 214).

Firstly, in a case in which the PV-PCS 220 configures the control unit, the PV-PCS 220 has a function to monitor the voltage value of the power grid and detects whether or not the voltage value of the power grid exceeds the predetermined system voltage threshold value.

When the voltage value of the power grid exceeds the predetermined system voltage threshold value, the PV-PCS 220 controls the operation mode of the storage battery 213 (or the EV 214) so as to start charging the storage battery 213 (or the EV 214). In particular, the PV-PCS 220 transmits a charge mode shift instruction to the storage PCS 240 through a communication line.

The predetermined system voltage threshold value is determined according to an allowable voltage value (for example, 101 V+6 V=107 V) that is allowable in a power grid. For example, the predetermined system voltage threshold value may be the allowable voltage value or a value obtained by subtracting a predetermined margin from the allowable voltage value.

When the voltage value of the power grid falls below the predetermined system voltage threshold value, the PV-PCS 220 controls the operation mode of the storage battery 213 (or the EV 214) so as to stop charging the storage battery 213 (or the EV 214). In particular, the PV-PCS 220 transmits a charge mode release instruction to the storage PCS 240 through the communication line.

It is noted that a predetermined system voltage threshold value for starting charging and a predetermined system voltage threshold value for stopping charging may be different from each other. For example, the predetermined system voltage threshold value for starting charging may be higher than the predetermined system voltage threshold value for stopping charging.

When the amount of power stored in the storage battery 213 (or the EV 214) exceeds a predetermined amount of power stored, the PV-PCS 220 controls the operation mode of the storage battery 213 (or the EV 214). In particular, the PV-PCS 220 transmits a charge mode release instruction to the storage PCS 240 through the communication line.

It is noted that the predetermined amount of power stored is determined according to an amount of power stored when the storage battery 213 (or the EV 214) is fully charged (amount of power stored at full charge). For example, the predetermined amount of power stored may be the amount of power stored at full charge or a value obtained by subtracting a predetermined margin from the amount of power stored at full charge.

When the amount of power generated by the PV 211 falls below a predetermined amount of power generated, the PV-PCS 220 controls the operation mode of the storage battery 213 (or the EV 214). In particular, the PV-PCS 220 transmits a charge mode release instruction to the storage PCS 240 through the communication line.

It is noted that the predetermined amount of power generated can be arbitrarily determined. For example, the predetermined amount of power generated is an amount of power generated at a level where the power required for charging cannot be supplied.

Secondly, in a case in which the storage PCS 240 configures the control unit, the storage PCS 240 has a function to monitor the voltage value of the power grid and detects whether or not the voltage value of the power grid exceeds the predetermined system voltage threshold value.

When the voltage value of the power grid exceeds the predetermined system voltage threshold value, the storage PCS 240 controls the operation mode of the storage battery 213 (or the EV 214) so as to start charging the storage battery 213 (or the EV 214).

When the voltage value of the power grid falls below the predetermined system voltage threshold value, the storage PCS 240 controls the operation mode of the storage battery 213 (or the EV 214) so as to stop charging the storage battery 213 (or the EV 214).

When the amount of power stored in the storage battery 213 (or the EV 214) exceeds the predetermined amount of power stored, the storage PCS 240 controls the operation mode of the storage battery 213 (or the EV 214).

When the amount of power generated by the PV 211 falls below the predetermined amount of power generated, the storage PCS 240 controls the operation mode of the storage battery 213 (or the EV 214). In particular, the storage PCS 240 receives the amount of power generated by the PV 211 from the PV-PCS 220 through the communication line.

In the first embodiment, when the storage battery 213 (or the EV 214) is in a charge mode, the power generated by the PV 211 may be supplied to the storage battery 213 (or the EV 214) through the power grid. Alternatively, the power generated by the PV 211 may be directly supplied to the storage battery 213 (or the EV 214) without passing through the power grid.

(Operation of Power Management System)

Hereinafter, the operation of the power management system according to the first embodiment will be described. FIG. 3 to FIG. 8 show the operation of the power management system 100 according to the first embodiment.

Firstly, the case in which the PV-PCS 220 configures the control unit is explained with reference to FIG. 3 to FIG. 5.

(1-1) Case in which Charge is Released in Accordance with System Voltage Value

Figure 3:
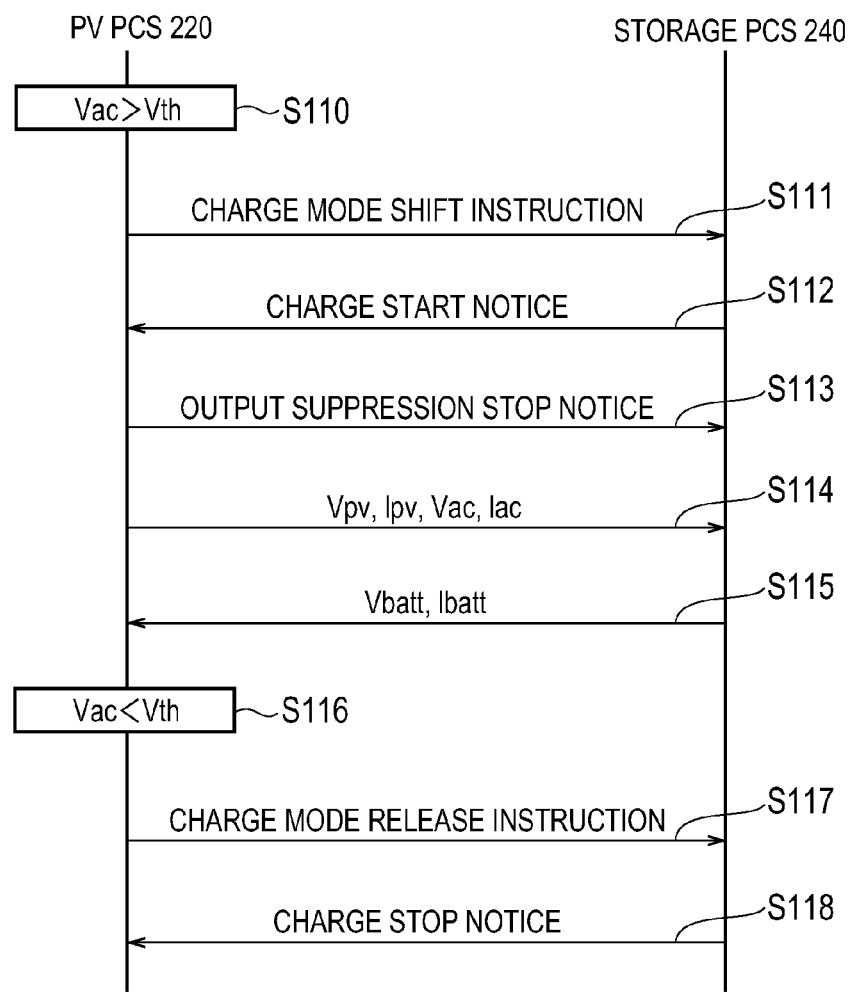
FIG. 3 is a diagram showing the operation of the power management system according to the first embodiment.

As shown in FIG. 3, in step 110, the PV-PCS 220 detects that a voltage value Vac of the power grid exceeds a predetermined system voltage threshold value Vth.

In step 111, the PV-PCS 220 transmits, to the storage PCS 240, a charge mode shift instruction instructing start of charging the storage battery 213 (or the EV 214). Further, the storage PCS 240 starts charging the storage battery 213 (or the EV 214) in response to the charge mode shift instruction.

In step 112, the storage PCS 240 transmits, to the PV-PCS 220, a notice indicating that charging the storage battery 213 (or the EV 214) has been started (charge start notice).

In step 113, the PV-PCS 220 transmits, to the storage PCS 240, an output suppression stop notice indicating that output suppression of the PV-PCS 220 has been stopped. In this case, the voltage value Vac of the power grid exceeds the predetermined system voltage threshold value Vth, and as a result, the PV-PCS 220 autonomously suppresses output. However, it should be noted that the output suppression is assumed to be stopped in response to the charge start notice. Accordingly, if such assumption does not exist, the process of step 113 may be omitted.

In step 114, the PV-PCS 220 transmits the amount of power generated by the PV 211 (Vpv, Ipv) to the storage PCS 240. In addition, the PV-PCS 220 transmits the power values of the power grid (Vac, Iac) to the storage PCS 240.

It is noted that the Vpv is a voltage value of the power generated by the PV 211, and the Ipv is a current value of the power generated by the PV 211. Further, the Vac is a voltage value of the power grid, and the Iac is a current value of the power grid.

It should be noted that the PV-PCS 220 periodically transmits the amount of power generated by the PV 211 (Vpv, Ipv) and the power values of the power grid (Vac, Iac).

In step 115, the storage PCS 240 transmits, to the PV-PCS 220, the amount of power stored in the storage battery 213 (or the EV 214) (Vbatt, Ibatt).

It is noted that the Vbatt is a voltage value of the power accumulated in the storage battery 213 (or the EV 214), and the Ibatt is a current value of the power accumulated in the storage battery 213 (or the EV 214).

It should be noted that the storage PCS 240 periodically transmits the amount of power stored in the storage battery 213 (or the EV 214) (Vbatt, Ibatt).

In step 116, the PV-PCS 220 detects that the voltage value Vac of the power grid falls below the predetermined system voltage threshold value Vth.

In step 117, the PV-PCS 220 transmits, to the storage PCS 240, the charge mode release instruction instructing stop of charging the storage battery 213 (or the EV 214). Further, the storage PCS 240 stops charging the storage battery 213 (or the EV 214) in response to the charge mode stop instruction.

In step 118, the storage PCS 240 transmits, to the PV-PCS 220, a notice indicating that the charge of the storage battery 213 (or the EV 214) has been stopped (charge stop notice).

Figure 4:
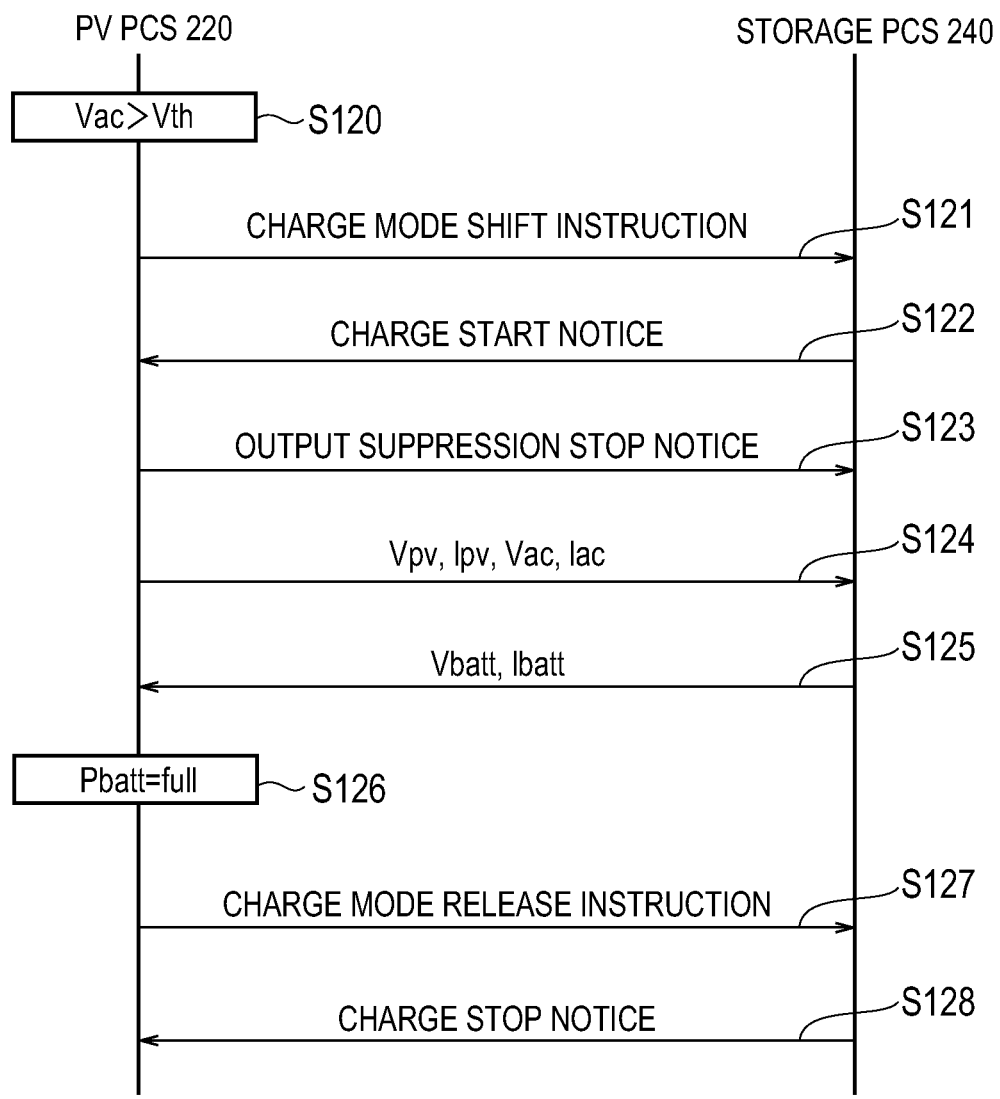
FIG. 4 is a diagram showing the operation of the power management system according to the first embodiment.

(1-2) Case in which Charge is Released in Accordance with Amount of Power Stored As shown in FIG. 4, processes of steps 120 to 125 are similar to the processes of steps 110 to 115. Accordingly, a description of steps 120 to 125 will be omitted.

In step 126, the PV-PCS 220 detects that the amount of power stored in the storage battery 213 (or the EV 214) exceeds the predetermined amount of power stored. In this case, the PV-PCS 220 detects that an amount of power stored in the storage battery 213 (or the EV 214) Pbatt reaches an amount of power stored at full charge "full".

In this case, the PV-PCS 220 may also detect that a voltage value of the amount of power stored in the storage battery 213 (or the EV 214) exceeds a predetermined threshold value. Alternatively, the PV-PCS 220 may also detect that a current value of the amount of power stored in the storage battery 213 (or the EV 214) exceeds a predetermined threshold value.

It is noted that processes of steps 127 and 128 are similar to the processes of steps 117 and 118. Accordingly, a description of steps 127 and 128 will be omitted.

Figure 5:
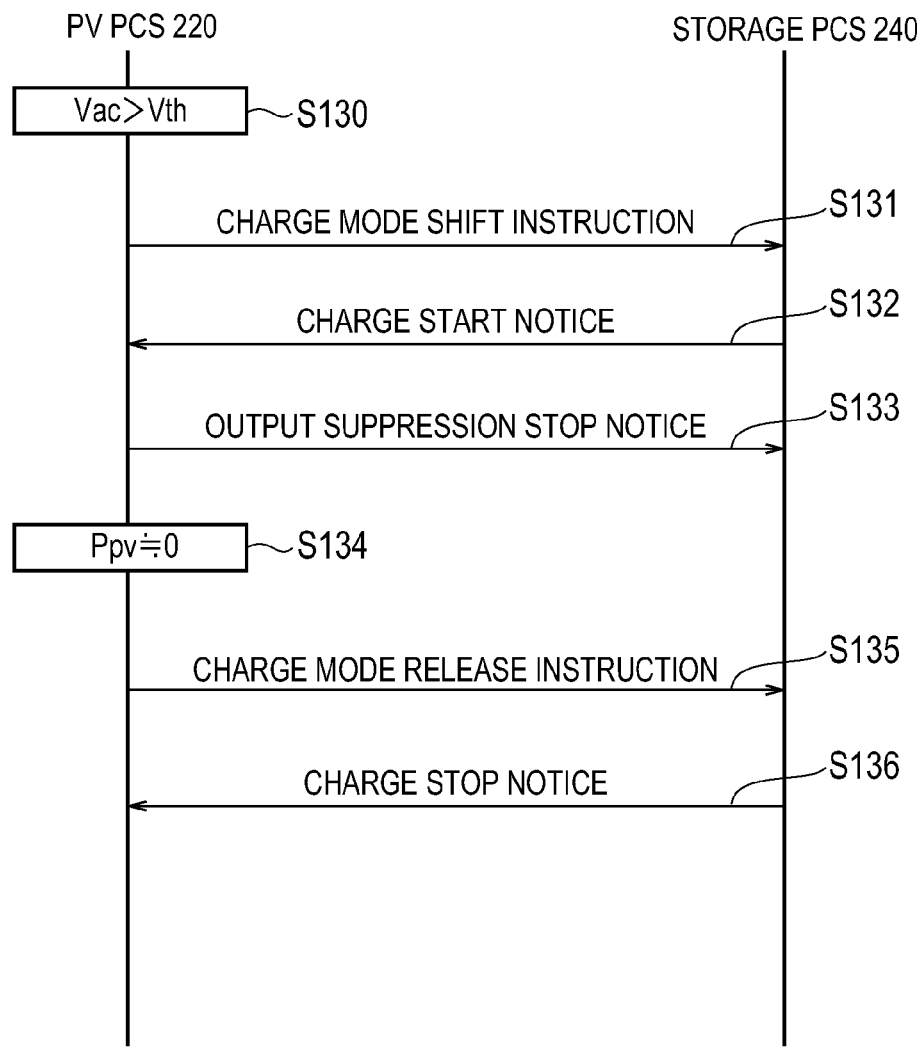
FIG. 5 is a diagram showing the operation of the power management system according to the first embodiment.

(1-3) Case in which Charge is Released in Accordance with Amount of Power Generated As shown in FIG. 5, processes of steps 130 to 133 are similar to the processes of steps 110 to 113. Accordingly, a description of steps 120 to 130 will be omitted.

In step 134, the PV-PCS 220 detects that the amount of power generated by the PV 211 falls below the predetermined amount of power generated. In this case, the PV-PCS 220 detects that an amount of power generated by the PV 211 Ppv becomes substantially zero.

In this case, the PV-PCS 220 may also detect that a voltage value of the power generated by the PV 211 falls below a predetermined threshold value. Alternatively, the PV-PCS 220 may also detect that a current value of the power generated by the PV 211 falls below a predetermined threshold value.

It is noted that processes of steps 135 and 136 are similar to the processes of steps 117 and 118. Accordingly, a description of steps 135 and 136 will be omitted.

Secondly, the case in which the storage PCS 240 configures the control unit is explained with reference to FIG. 6 to FIG. 8.

(2-1) Case in which Charge is Released in Accordance with System Voltage Value

Figure 6:
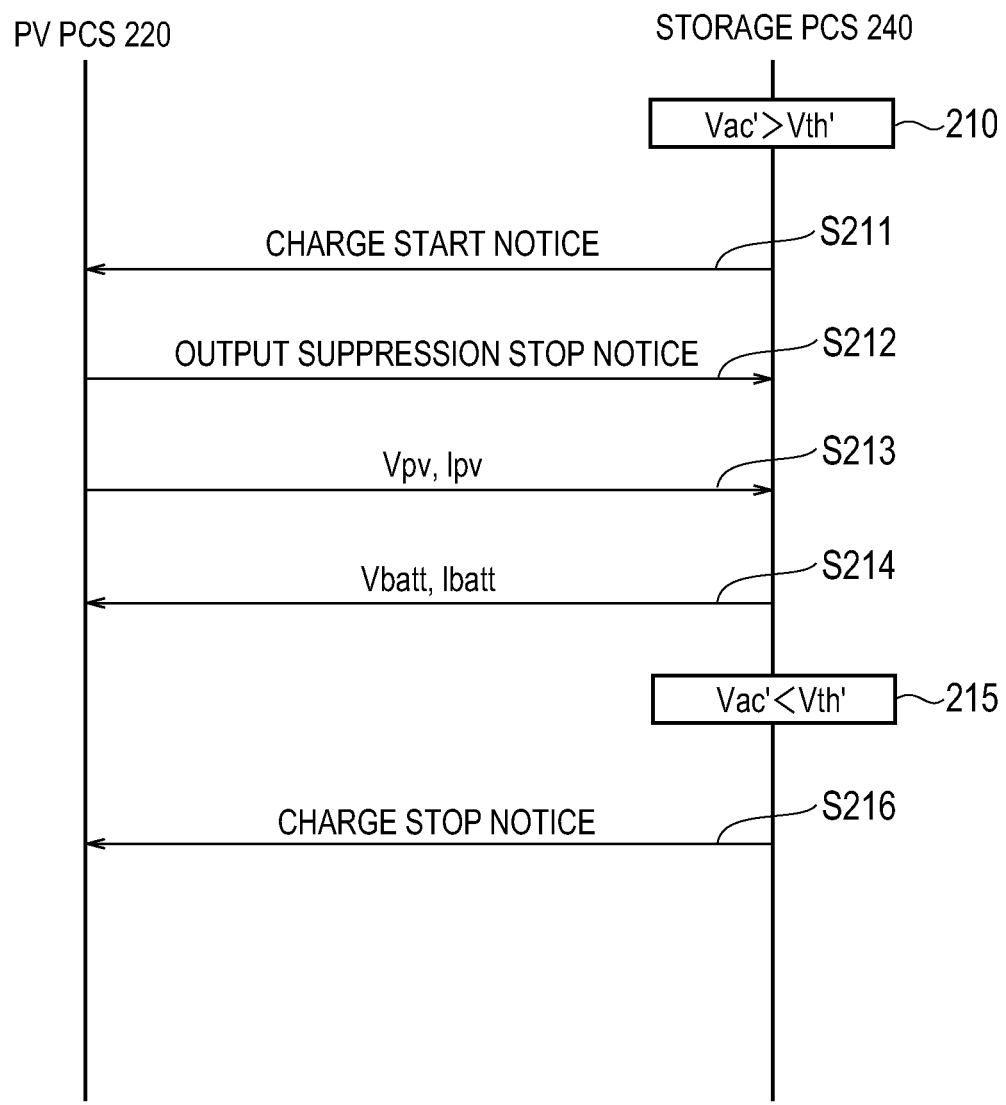
FIG. 6 is a diagram showing the operation of the power management system according to the first embodiment.

As shown in FIG. 6, in step 210, the storage PCS 240 detects that the voltage value Vac of the power grid exceeds the predetermined system voltage threshold value Vth. Further, the storage PCS 240 starts charging the storage battery 213 (or the EV 214).

In step 211, the storage PCS 240 transmits, to the PV-PCS 220, the notice indicating that charging the storage battery 213 (or the EV 214) has been started (charge start notice).

In step 212, the PV-PCS 220 transmits, to the storage PCS 240, the output suppression stop notice indicating that output suppression of the PV-PCS 220 has been stopped.

In step 213, the PV-PCS 220 transmits the amount of power generated by the PV 211 (Vpv, Ipv) to the storage PCS 240. It should be noted that the PV-PCS 220 periodically transmits the amount of power generated by the PV 211 (Vpv, Ipv).

In step 214, the storage PCS 240 transmits, to the PV-PCS 220, the amount of power stored in the storage battery 213 (or the EV 214) (Vbatt, Ibatt). It should be noted that the storage PCS 240 periodically transmits the amount of power stored in the storage battery 213 (or the EV 214) (Vbatt, Ibatt).

In step 215, the storage PCS 240 detects that a voltage value Vac' of the power grid falls below a predetermined system voltage threshold value Vth'. Further, the storage PCS 240 stops charging the storage battery 213 (or the EV 214).

In step 216, the storage PCS 240 transmits, to the PV-PCS 220, the notice indicating that the charge of the storage battery 213 (or the EV 214) has been stopped (charge stop notice).

Figure 7:
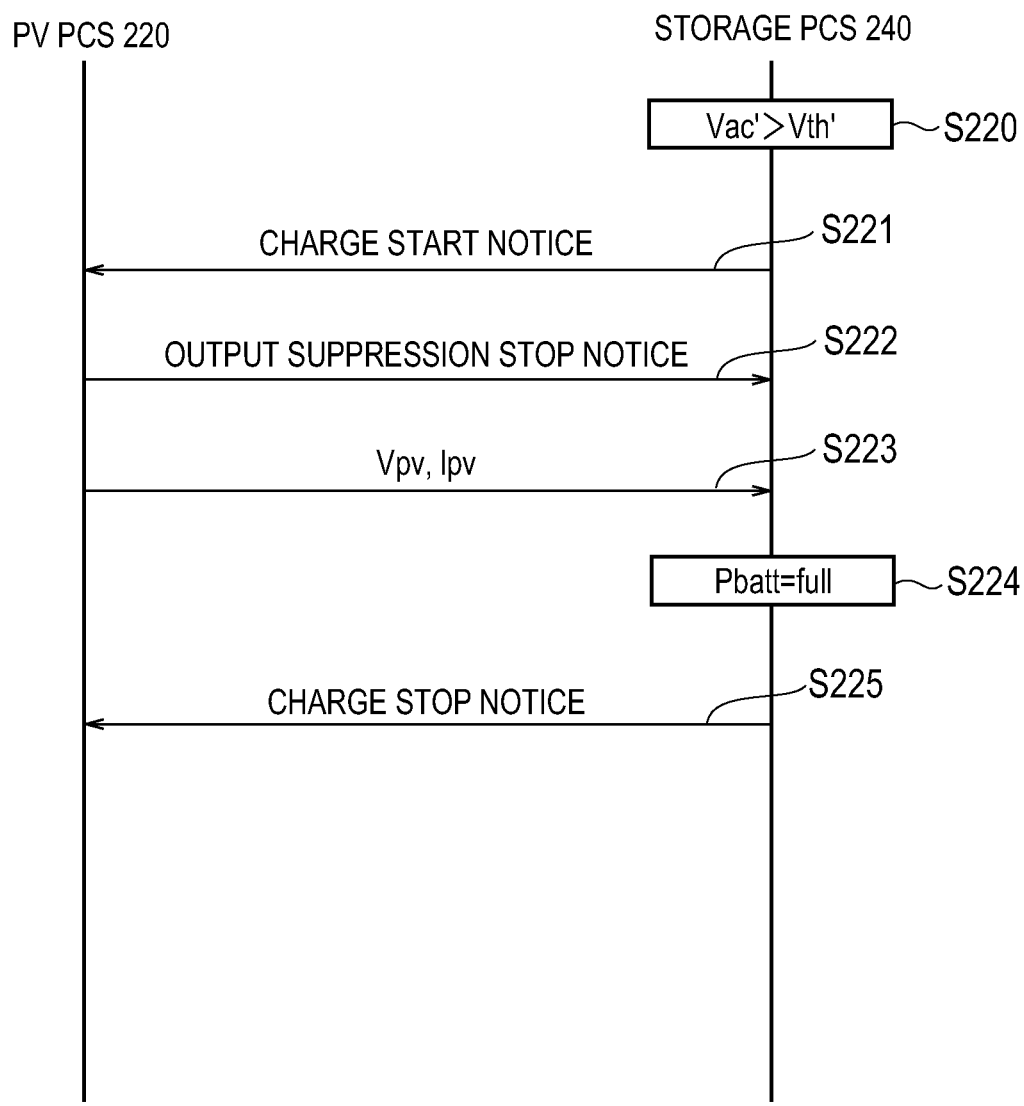
FIG. 7 is a diagram showing the operation of the power management system according to the first embodiment.

(2-2) Case in which Charge is Released in Accordance with Amount of Power Stored As shown in FIG. 7, processes of steps 220 to 223 are similar to the processes of steps 210 to 213. Accordingly, a description of steps 220 to 223 will be omitted.

In step 224, the storage PCS 240 detects that the amount of power stored in the storage battery 213 (or the EV 214) exceeds the predetermined amount of power stored. In this case, the storage PCS 240 detects that the amount of power stored in the storage battery 213 (or the EV 214) Pbatt reaches the amount of power stored at full charge "full". Further, the storage PCS 240 stops charging the storage battery 213 (or the EV 214).

In this case, the storage PCS 240 may also detect that the voltage value of the amount of power stored in the storage battery 213 (or the EV 214) exceeds a predetermined threshold value. Alternatively, the storage PCS 240 may also detect that the current value of the amount of power stored in the storage battery 213 (or the EV 214) exceeds a predetermined threshold value.

It is noted that a process of step 225 is similar to the process of step 216. Accordingly, a description of step 225 will be omitted.

Figure 8:
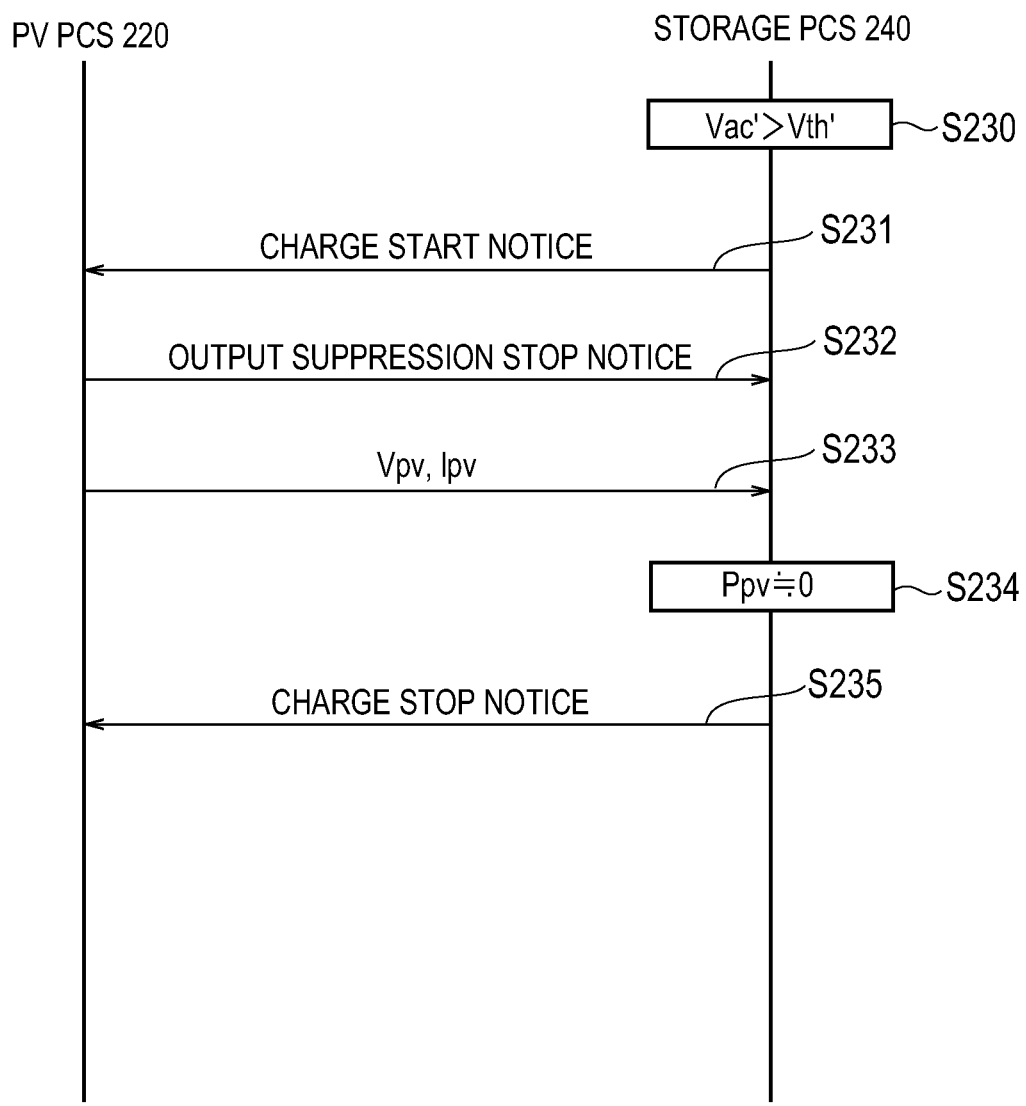
FIG. 8 is a diagram showing the operation of the power management system according to the first embodiment.

(2-3) Case in which Charge is Released in Accordance with Amount of Power Generated As shown in FIG. 8, processes of steps 230 to 233 are similar to the processes of steps 210 to 213. Accordingly, a description of steps 230 to 233 will be omitted.

In step 234, the storage PCS 240 detects that the amount of power generated by the PV 211 falls below the predetermined amount of power generated. In this case, the storage PCS 240 detects that the amount of power generated by the PV 211 Ppv becomes substantially zero. Further, the storage PCS 240 stops charging the storage battery 213 (or the EV 214).

In this case, the storage PCS 240 may also detect that the voltage value of the power generated by the PV 211 falls below a predetermined threshold value. Alternatively, the storage PCS 240 may also detect that the current value of the power generated by the PV 211 falls below a predetermined threshold value.

It is noted that a process of step 235 is similar to the process of step 216. Accordingly, a description of step 235 will be omitted.

Operation and Effect

In the first embodiment, when the voltage value of the power grid exceeds the predetermined system voltage threshold value, the control unit (PV-PCS 220 or storage PCS 240) controls the operation mode of the storage battery (the storage battery 213 or the EV 214) so as to start charging the storage battery. Accordingly, in the case in which the power generated by the power generation equipment (PV 211) is supplied to the storage battery via the power grid, a load connected to the power grid is increased and an increase in voltage value of the power grid is suppressed. In a case in which the power generated by the power generation equipment is supplied to the storage battery without passing through the power grid, the power generated by the power generation equipment is used without affecting the voltage value of the power grid. Thus, the power generation capability of the power generation equipment can be utilized.

Other Embodiment

As described above, the present invention has been described according to the embodiment. It must not be understood that, however, the discussions and the drawings constituting a part of this disclosure limit the present invention. From this disclosure, various alternative embodiments, examples and operational techniques are apparent to those skilled in the art.

In the embodiment, the PV 211 and the storage battery 213 (or the EV 214) are controlled by separate PCSs. However, the PV 211 and the storage battery 213 (or the EV 214) may be controlled by a single PCS (so-called hybrid PCS).

In the embodiment, the PV 211 was described as an example of the power generation equipment. However, the power generation equipment may be the SOFC 212. In such a case, the SOFC-PCS 230 configures the control unit. Alternatively, the power generation equipment may be a wind power generation equipment, a water power generation equipment, or the like. In such cases, a PCS that controls the power generation equipment configures the control unit.

In the embodiment, in the case in which the power generated by the PV 211 is directly supplied to the storage battery 213 (or the EV 214) without passing through the power grid, the power generated by the PV 211 is converted into AC power, and then, the power converted into the AC power is converted again into DC power. However, the power generated by the PV 211 may be supplied to the storage battery 213 (or the EV 214) without being converted into purchase power.

In the embodiment, the consumer 10 was described as an example of a unit of controlling the operation mode of the storage battery 213 (or the EV 214). However, the embodiment is not limited thereto. For example, the unit of controlling the operation mode of the storage battery 213 (or the EV 214) may be the plurality of consumers 10. In such a case, the above-described EMS 20 or smart server 40 configures the control unit.

Although details of the communication line are not particularly mentioned in the embodiment, the communication line may be wired or wireless.

Details of the amount of power stored are not particularly mentioned in the embodiment, however, the amount of power stored may be a value indicated by one of current, voltage, power, power per unit time, and current per unit time.

Note that the entire content of the Japanese Patent Application No. 2011-164488 (filed on Jul. 27, 2011) is incorporated herein by reference.

INDUSTRIAL APPLICABILITY

According to the present invention, it is possible to provide the power management system, with which power generation capability of the power generation equipment can be utilized.

The invention claimed is:

1. A power management system comprising a power generation equipment that generates power and a storage battery that stores power, and being connected to a power grid, the power management system comprising:
a control unit that
controls an operation mode of the storage battery so as to start charging the storage battery when a voltage value of the power grid exceeds a predetermined system voltage threshold value, and
controls the operation mode of the storage battery so as to stop charging the storage battery when the power generated by the power generation equipment falls below a predetermined amount of power.

2. The power management system according to claim 1, wherein when the voltage value of the power grid exceeds the predetermined system voltage threshold value, the control unit controls a connection between the power generation equipment and the storage battery so that the power supplied from the power generation equipment is directly supplied to the storage battery without passing through the power grid.

3. The power management system according to claim 1, comprising:
a first control unit that controls the storage battery, wherein the first control unit detects whether or not the voltage value of the power grid exceeds the predetermined system voltage threshold value and configures the control unit.

4. The power management system according to claim 1, comprising:
a second control unit that controls the power generation equipment, wherein the second control unit detects whether or not the voltage value of the power grid exceeds the predetermined system voltage threshold value and configures the control unit.

5. The power management system according to claim 1, wherein when the voltage value of the power grid falls below the predetermined system voltage threshold value, the control unit controls the operation mode of the storage battery so as to stop charging the storage battery.

6. The power management system according to claim 1, wherein when the amount of power stored in the storage battery exceeds a predetermined amount of power stored, the control unit controls the operation mode of the storage battery so as to stop charging the storage battery.

7. A power management method used in a power management system comprising a power generation equipment that generates power and a storage battery that stores power, and being connected to a power grid, the method comprising:
controlling an operation mode of the storage battery so as to start charging the storage battery when a voltage value of the power grid exceeds a predetermined system voltage threshold value; and
controlling the operation mode of the storage battery so as to stop charging the storage battery when the power generated by the power generation equipment falls below a predetermined amount of power.

* * * * *